United States Patent

Bamberger et al.

[11] 3,927,192
[45] Dec. 16, 1975

[54] CHEMICAL CYCLE FOR THERMOCHEMICAL PRODUCTION OF HYDROGEN FROM WATER

[75] Inventors: Carlos E. Bamberger; Donald M. Richardson, both of Oak Ridge, Tenn.

[73] Assignee: The United States of America as represented by the United States Energy Research and Development Administration, Washington, D.C.

[22] Filed: Jan. 29, 1975

[21] Appl. No.: 545,042

[52] U.S. Cl. .................................. 423/648; 423/579
[51] Int. Cl.² ........................................... C01B 1/02
[58] Field of Search ............ 423/607, 596, 641, 579, 423/580, 648

[56] References Cited
UNITED STATES PATENTS

| | | | |
|---|---|---|---|
| 2,400,272 | 5/1946 | Todd | 423/596 |
| 3,786,138 | 1/1974 | Shalit et al. | 423/648 |
| 3,859,412 | 1/1975 | Okabe et al. | 423/596 |

*Primary Examiner*—O. R. Vertiz
*Assistant Examiner*—Wayne A. Langel
*Attorney, Agent, or Firm*—Dean E. Carlson; David S. Zachry; John Hardaway

[57] ABSTRACT

Hydrogen is produced by a closed cyclic process involving the reaction of chromic oxide with an alkali metal hydroxide to produce hydrogen, water and an alkali metal hypochromate as reaction products. The hypochromate is converted to the chromate by reaction with water to also produce the beginning chromic oxide and alkali metal hydroxide. The cycle is completed by reacting the thus formed chromate with the excess alkali metal hydroxide at a higher temperature to produce hypochromate water and oxygen.

4 Claims, 1 Drawing Figure

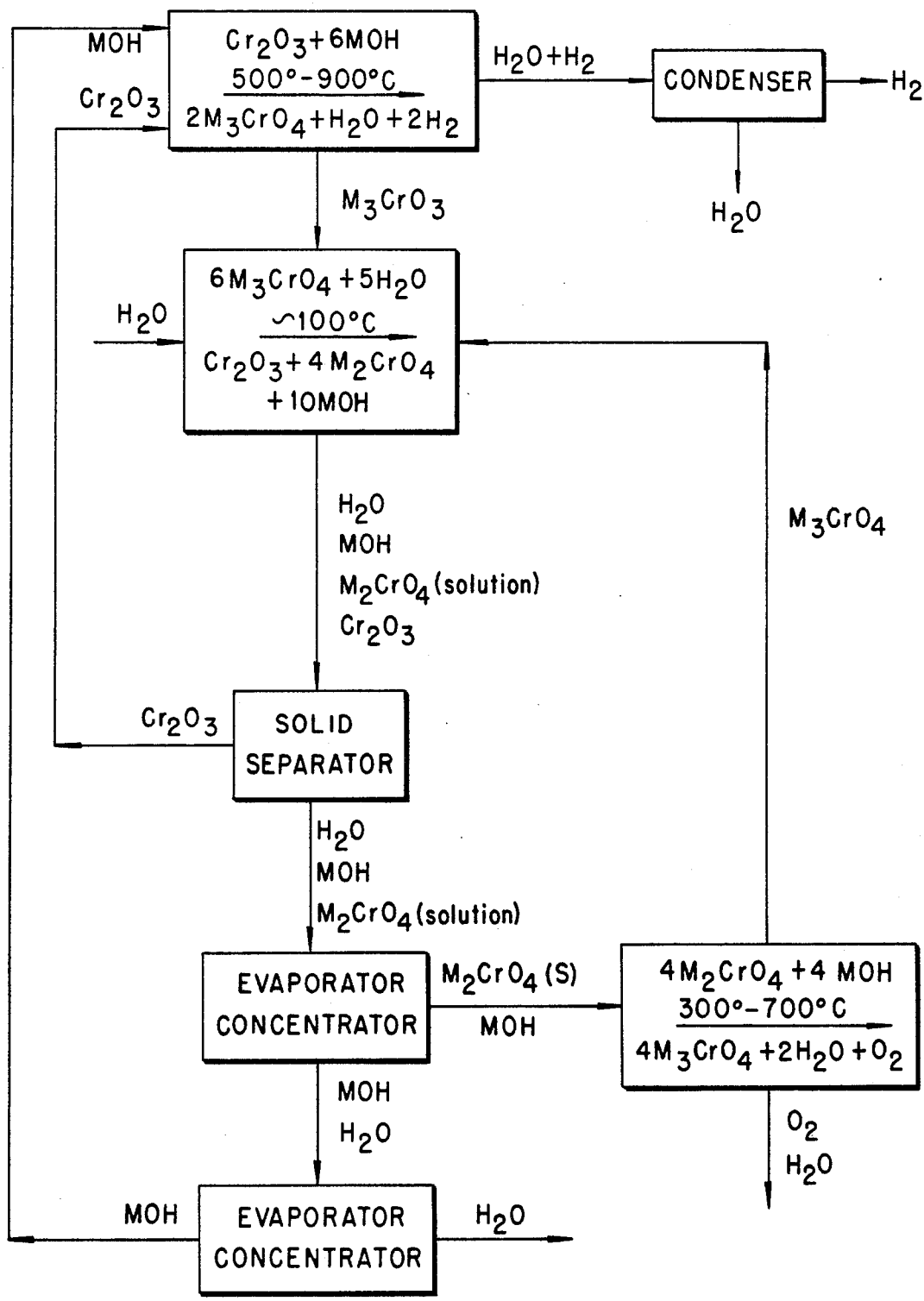

CHEMICAL CYCLE FOR THERMOCHEMICAL PRODUCTION OF HYDROGEN FROM WATER

Background of the Invention

This invention was made in the course of, or under, a contract with the United States Atomic Energy Commission. It relates generally to the art of thermochemical hydrogen production.

Hydrogen is presently considered to be an attractive energy source for future application. Hydrogen has many attributes which make it a logical replacement for fossil fuels which are being rapidly consumed. The combustion of hydrogen produces no obnoxious products and thus no insult to the environment. Existing energy transport means and consuming equipment can be adapted with present technology for a hydrogen-based energy system. Natural gas pipelines, for example, can be converted to hydrogen carrying pipelines with minor modifications. Experimental automobiles are presently operating with modified conventional internal combustion engines using hydrogen as a fuel.

With prospects for hydrogen utilization becoming evident, means for producing hydrogen need to be upgraded and increased. Conventionally, hydrogen has been produced by the electrolysis of water. Electrolysis, however, is highly inefficient when considering the inefficiencies present in electricity production coupled with an efficiency of about 80 percent for electrolysis itself. Inherent in the use of electrolysis to produce hydrogen is the general futility of using one energy source, typically fossil fuels at present, at the point of electricity production to ultimately produce hydrogen at the point of electrolysis. The disadvantages and excess consumption of fossil fuels are obviously not overcome by such a process. Chemical processes for the direct conversion of fossil fuels and water into a hydrogen product are presently at the point of technical feasibility. This overcomes many of the inefficiencies and disadvantages of electrolysis. However, prudence indicates that fossil fuels should be preserved to the extent possible for long term pharmaceutical, chemical, and metallurgical uses.

Thermochemical processes present the most attractive means for producing hydrogen. Via this technique water is broken down into hydrogen and oxygen through a series of chemical reactions not involving the use of fossil fuels.

This series of reactions is desirably carried out in a closed cyclic manner such that all products except water, hydrogen, and oxygen are reused as reactants in the other reactions. One such process is disclosed in U.S. Pat. No. 3,490,871, which utilizes the reaction of cesium with water to release hydrogen. Another such process is disclosed in commonly assigned copending application Ser. No. 487,323 of July 10, 1974, which involves the reaction of copper and magnesium chlorides with water to produce hydrogen in a closed cyclic manner.

One of the objects of the thermochemical process is the direct utilization of heat from an energy producing facility such as a nuclear reactor or solar sources. The upper temperature limit of such source is presently about 1300°K for a high-temperature, gas-cooled reactor and 3500°K for a solar furnace.

SUMMARY OF THE INVENTION

It is thus an object of this invention to provide a closed cycle thermochemical process for producing hydrogen and oxygen.

It is a further object of this invention to provide such a process in which the temperatures of the various reactions are below that encountered in a nuclear reactor, such that the heat required for such reactions may be supplied directly from the heat of a nuclear reactor.

These as well as other objects are accomplished by producing hydrogen in a closed cyclic process involving the reaction of chromic oxide with an alkali metal hydroxide to produce hydrogen, water and an alkali metal hypochromate as reaction products. The hypochromate is converted to the chromate by reaction with water to also produce the beginning chromic oxide and alkali metal hydroxide. The cycle is completed by reacting the thus formed chromate with the excess alkali metal hydroxide at a higher temperature to produce the hypochromate, water and oxygen.

BRIEF DESCRIPTION OF THE DRAWINGS

The single FIGURE of drawing schematically illustrates the process in accordance with this invention.

DETAILED DESCRIPTION

According to this invention, it has been found that hydrogen can be produced by a series of three chemical reactions which have the net effect of splitting water into hydrogen and oxygen. The reactions which are utilized in carrying out the process of this invention are as follows:

$$Cr_2O_3 + 6MOH \rightarrow 2M_3CrO_4 + H_2O + 2H_2 \quad 1.$$
$$6M_3CrO_4 + 5H_2O \rightarrow Cr_2O_3 + 4M_2CrO_4 + 10MOH \quad 2.$$
$$4M_2CrO_4 + 4MOH \rightarrow 4M_3CrO_4 + 2H_2O + O_2 \quad 3.$$

As can be noted from the above reactions, all products with the exception of hydrogen and oxygen are reused as reactants in the other reactions, such that water is the only reactant which ideally needs to be continuously added to the process. As will be apparent from the description which follows, all three reactions go substantially to completion and all separations are relatively simple. Since the reactions go substantially to completion, the process is best carried out in either a batchwise or semicontinuous manner. The overall process of this invention can best be understood from the description below with reference to the single figure of drawing.

The symbol "M" as used in the above reactions designates an alkali metal selected from the group consisting of potassium, cesium, and rubidium. While all three alkali metals perform equally well, potassium is preferred for reasons other than performance. The remainder of the description will thus be given with a nonlimiting reference to potassium. While such reference could equally well be made to cesium or rubidium, potassium will be referred to for reasons of clarity.

Reaction (1) is best carried out within the temperature range of 500° to 900°C with about 700°C being preferred. To minimize separation problems the proportion of reactants in reaction (1) should be nearly stoichiometric. However, it has been found desirable to operate with a slight excess of potassium hydroxide, e.g. 2 to 3%, in order to consume all chromic oxide in the reaction. If a slight amount of potassium hydroxide is present in the product and is separated with the potassium hypochromate no adverse effects arise. Reaction (1) may be carried out in a copper, platinum, or alumina reaction vessel having a gas inlet means in the bottom thereof and a gas exit at a point above the reactants. The reaction is thus preferably carried out by sweeping or bubbling an inert carrier gas through the mixture. The gaseous reaction products (i.e. $H_2O$ and $H_2$) are removed by the carrier gas for condensation of the water and recovery of the hydrogen. The hydrogen may be separated from the carrier gas by conventional means such as liquefaction of the carrier, use of a semipermeable membrane of palladium-platinum or formation of a hydride such as $MgH_2$ or $Fe-Ti-H_2$. Of course, reaction (1) may be carried out without the use of a carrier by continuously exhausting or venting the gaseous atmosphere above the reaction. By this technique no separation from a carrier gas is required. However, the kinetics of the reaction are improved by the use of a carrier since the carrier continuously removes the reaction products.

Reaction (1) goes to substantial completion at 700°C in about 8 hours. The completion of the reaction is detected by the absence of hydrogen from the off gas stream. At the completion of reaction (1) a solid residue of potassium hypochromate with possibly a small amount of potassium hydroxide remain in the reaction vessel. This residue is crushed and used as a reactant in reaction (2). Reaction (2) is carried out by simply boiling the residue from reaction (1) in water. As will be pointed out below, reaction (3) leaves a similar residue which is also boiled in the process of reaction (2). Potassium hypochromate via reaction (2) reacts with water to form chromic oxide, potassium chromate and potassium hydroxide. Boiling for about 8 to 10 minutes is necessary to take the reaction to substantial completion. The termination of the reaction is detected by observing the color of the solution. When the reaction has terminated there will be no further increase in yellow coloration. For reasons of kinetics and losses due to boiling, it is preferred to carry out reaction (2) with about 10 times the stoichiometric amount of water. However, the use of excess water increases the amount of energy which is needed to carry out the subsequent separations. For this reason excess water should be kept at a minimum.

At the completion of reaction (2) a solid residue of chromic oxide exists within a liquid solution of water, potassium hydroxide and potassium chromate. The chromic oxide is separated by filtration for reuse in reaction (1). The remaining material contains the reactants for reaction (3) along with excess potassium hydroxide for reaction (1) and water.

The potassium chromate and potassium hydroxide which remain in aqueous solution are separated by fractional crystallization for reuse in reactions (1) and (3). Detailed solubility data for this system are published in W. F. Linke, *Solubilities, Volume II*, American Chemical Society, Washington, D. C. 1965. Various schemes of separation may be devised using this data as a guide. The preferred method of this invention is to first precipitate or crystallize all of the potassium chromate in solution along with an equimolar amount of potassium hydroxide. This provides all of the reactants for reaction (3) which may be removed from the remainder of the solution by filtration. The remaining solution contains the potassium hydroxide which is recovered for use in reaction (1) by evaporation.

Preferably the fractional crystallization is carried out by evaporating to saturation and then cooling. A saturated aqueous solution with a molar ratio of potassium chromate to hydroxide of about 4 to 10 will have a concentration of about 29 grams of potassium chromate and 21 grams potassium hydroxide per 100 grams of water. A solution which is thus saturated with respect to both components at 60°C may then be fractionally crystallized by evaporating 73.3 wt. percent of the water at any temperature and then cooling to 0°C. Alternatively, the solution may be fractionally crystallized by removing about 85 wt. percent of the water and then cooling to 30°C. In either event, substantially all of the potassium chromate and an equimolar amount of potassium hydroxide will crystallize from the solution.

Reaction (3) is carried out by merely heating the equimolar precipitates from above in a reaction vessel similar to that described for use in reaction (1) to a temperature within the range of 300° to 700°C and preferably about 470°C. The reaction is preferably carried out with a slight excess of potassium hydroxide so as to consume all potassium chromate. About 4 hours is required at about 500°C for the reaction to go substantially to completion. This reaction is also preferably carried out by passing of an inert carrier gas through the reactants. The water and oxygen products are thus swept from the reaction vessel by the carrier where the water may be removed from the oxygen product by condensation. The oxygen and inert carrier may be separated by conventional means such as liquefaction or liquefaction and distillation.

At the conclusion of reaction (3), a solid residue of potassium hypochromate remains which is reused in reaction (2) as described above. Any excess hydroxide which remains is also recycled to reaction (2) without separation. With reaction (3) being completed, water has been broken into the individual components of hydrogen and oxygen through the application of heat and the appropriate reactions of this invention.

Having generally described the process of this invention, the following specific examples are given as a further illustration thereof.

EXAMPLE I

Reaction (1) was tested experimentally by heating 2.88g $Cr_2O_3$ (RG) with 5.52 g KOH pellets (~86%) in a copper crucible located inside a quartz tube. Argon was used as an inert carrier gas at 350 cc/min. and the $H_2$ evolved was measured with a Gow-Mac hydrogen detector. For safety reasons the argon flow rate was maintained such as to keep the percentage of hydrogen in the effluent stream at less than 4 volume percent. Occasionally samples of gas were also analyzed by gas spectrometry. The assembly was located in a Marshall furnace where it was heated at continuously increasing temperatures. Evolution of hydrogen was first detected at approximately 500°C, and increased with increasing temperature, reaching a maximum at ~700°C (0.6% in the gas stream). Heating was continued up to ~800°C while $H_2$ evolution continued. The mixture was cooled to room temperature, then homogenized by grinding in a mortar and reheated under Ar as described above. The evolution of $H_2$ was noted between ~ 450° and 900°C. An integration of the total $H_2$ evolved indicated 540 cc, which corresponds to a yield of 79% based on the KOH present. On cooling the contents were homogeneous greenish-black, a portion was examined by X-ray diffraction. This indicated the presence of $K_3CrO_4$.

EXAMPLE II

A portion (2.33 g) of the greenish-black solid ($K_3CrO_4$) was added to 300 cc of distilled water and boiled for 2–3 minutes. A green gelatinous precipitate ($Cr_2O_3$ aq) separated immediately and the supernate was yellow. The solid was separated by filtration and the solution was analyzed for $CrO_4^=$ by titration and by spectrophotometry. The concentration of $CrO_4^=$ allowed calculation of an evolution of $H_2$ of 430 ml, which considering the uncertainties of the calculations, agrees quite well with the amount measured directly (540 cc).

EXAMPLE III

Reaction (3) was tested by heating 4.5 g KOH and 11.7 g $K_2CrO_4$ in a quartz tube under a flow of argon, to temperatures up to ~1000°C. On cooling, the originally light yellow mixture turned green, the color of $K_3CrO_4$. In a second experiment, 21 g KOH and 5.3 g $K_2CrO_4$ were heated under argon and the effluent gases were passed through a Beckman detector specific for oxygen. Oxygen evolution was detected from ~300°C to ~700°C. On cooling the solid turned green. When a portion of the green solid was reacted with water, it behaved as indicated in reaction (2), thus confirming the presence of $K_3CrO_4$.

What is claimed is:

1. A substantially closed thermochemical process for decomposing water, comprising the steps of:

reacting chromic oxide with an alkali metal hydroxide selected from the group consisting of potassium hydroxide, rubidium hydroxide, and cesium hydroxide to produce alkali metal hypochromate, water and hydrogen as reaction products;

separating said hydrogen as a product;

reacting said alkali metal hypochromate with water to produce chromic oxide, alkali metal chromate and alkali metal hydroxide as reaction products;

reusing said chromic oxide and a portion of said alkali metal hydroxide products from said second mentioned step of reacting in said first mentioned step of reacting;

reacting said alkali metal chromate and the remaining portion of said alkali metal hydroxide from said second mentioned step of reacting to produce alkali metal hypochromate, water, and oxygen as reaction products;

separating said oxygen as a product; and reusing said alkali metal hypochromate from said third mentioned step of reacting in said second mentioned step of reacting.

2. The process according to claim 1 wherein said first mentioned step of reacting is carried out at a temperature within the range of 500° to 900°C.

3. The process according to claim 1 wherein said second mentioned step of reacting is carried out by boiling the reactants.

4. The process according to claim 1 wherein said third mentioned step of reacting is carried out at a temperature within the range of 300° to 700°C.

* * * * *